United States Patent [19]

Butsch

[11] 4,101,945

[45] Jul. 18, 1978

[54] DRIVE SPINDLE ASSEMBLY FOR DISC FILE

[75] Inventor: Otto R. Butsch, Ann Arbor, Mich.

[73] Assignee: Sycor, Inc., Ann Arbor, Mich.

[21] Appl. No.: 721,042

[22] Filed: Sep. 7, 1976

[51] Int. Cl.² .................. G11B 17/32; G11B 25/04
[52] U.S. Cl. ................................. 360/102; 310/62; 360/97; 346/137
[58] Field of Search ............... 360/102, 99, 97, 98, 360/133, 135, 86; 274/39 A; 346/137; 310/177–178, 60–62

[56] References Cited

U.S. PATENT DOCUMENTS

| | | | |
|---|---|---|---|
| 2,899,260 | 8/1959 | Farrand et al. | 360/102 |
| 3,047,869 | 7/1962 | Marcum et al. | 360/102 |
| 3,225,338 | 12/1965 | Kelner et al. | 360/102 |
| 3,427,483 | 2/1969 | Selitrennikoff | 310/177 |
| 3,643,119 | 2/1972 | Lukens | 310/62 |
| 3,740,735 | 6/1973 | Gabor | 360/97 |
| 3,864,748 | 2/1975 | Herdman et al. | 360/102 |
| 3,882,335 | 5/1975 | Fries | 310/62 |
| 3,969,767 | 8/1976 | Griffiths et al. | 360/99 |
| 4,019,204 | 4/1977 | Griffiths et al. | 360/102 |

*Primary Examiner*—Alfred H. Eddleman
*Attorney, Agent, or Firm*—Price, Heneveld, Huizenga & Cooper

[57] ABSTRACT

A drive spindle assembly for a disc recorder, and particularly one using a rigid disc, having a direct-coupled spindle shaft arrangement which includes a disc-support platform mounted concentrically at one end of the spindle shaft and a DC motor attached to the other end of the spindle shaft, which spaced bearings supporting the shaft medially between the motor and the support platform. Preferably, the motor is of the flat, compact printed circuit-rotor type known as a "pancake" motor, and the disc-support platform preferably incorporates air-impelling vanes on one side and bleed orifices extending through it, so that air is drawn along the spindle assembly to cool it, and then impelled outwardly over both sides of the recording disc to help aerodynamically fly the recording heads on a thin film of air over the surface of the disc.

24 Claims, 4 Drawing Figures

DRIVE SPINDLE ASSEMBLY FOR DISC FILE

BACKGROUND OF THE INVENTION

In the past, there have been many different specific types of rotational drives for disc recorders, including magnetic disc recorders, or disc files, of the type used for data processing applications, which are rather sophisticated devices which record very large amounts of digitally encoded data at very high recording densities. In such devices, the disc (or discs) are usually mounted on a shaft or spindle, and the coupling between the shaft and a motor which drives it is usually done with a flexible belt drive. Usually, an AC motor is used in such a belt drive, with various schemes employed for speed regulation, which is highly important.

SUMMARY OF THE INVENTION

This invention teaches use of a DC drive motor in a data recorder, and use of direct coupling between such motor and a drive shaft for the disc. Elimination of the conventional flexible belt drive not only simplifies construction but improves the coupling between the spindle and the motor. Additionally, eliminating the usual AC motor and providing a DC motor greatly improves speed control, which is a most important factor in disc files for data storage. Additionally, the DC motor can more easily be made to have a relatively small size compared to the AC motor. In particular, it is advantageous to use a flat "pancake type" DC motor connected to the spindle.

The drive spindle assembly also preferably includes a direct-coupled impeller pump for cooling of the disc file and for aerodynamically supporting recording heads adjacent a rotating disc. The impeller pump and other parts of the spindle assembly are of material having good heat conducting properties. Thus, with combination of the good-heat conducting material and the air flow created by the impeller pump, the spindle assembly provides for excellent heat transfer and dissipation, as well as other important advantages. The spindle and the aerodynamic action on the disc provide for excellent support of the disc and stable operation, which enhances recording. The use of a spindle directly connected to a DC motor, especially one which is of the flat "pancake type," eliminates use of a flexible belt drive and provides for a high degree of compactness, as well as improved speed control. These features are extremely advantageous in a disc file, and this invention provides such features. The result is a flat, compact disc recorder package with a common drive shaft extending through an integrated, direct coupled drive spindle.

DETAILED DESCRIPTION OF THE PREFERRED EMBODIMENT

Figure 1:
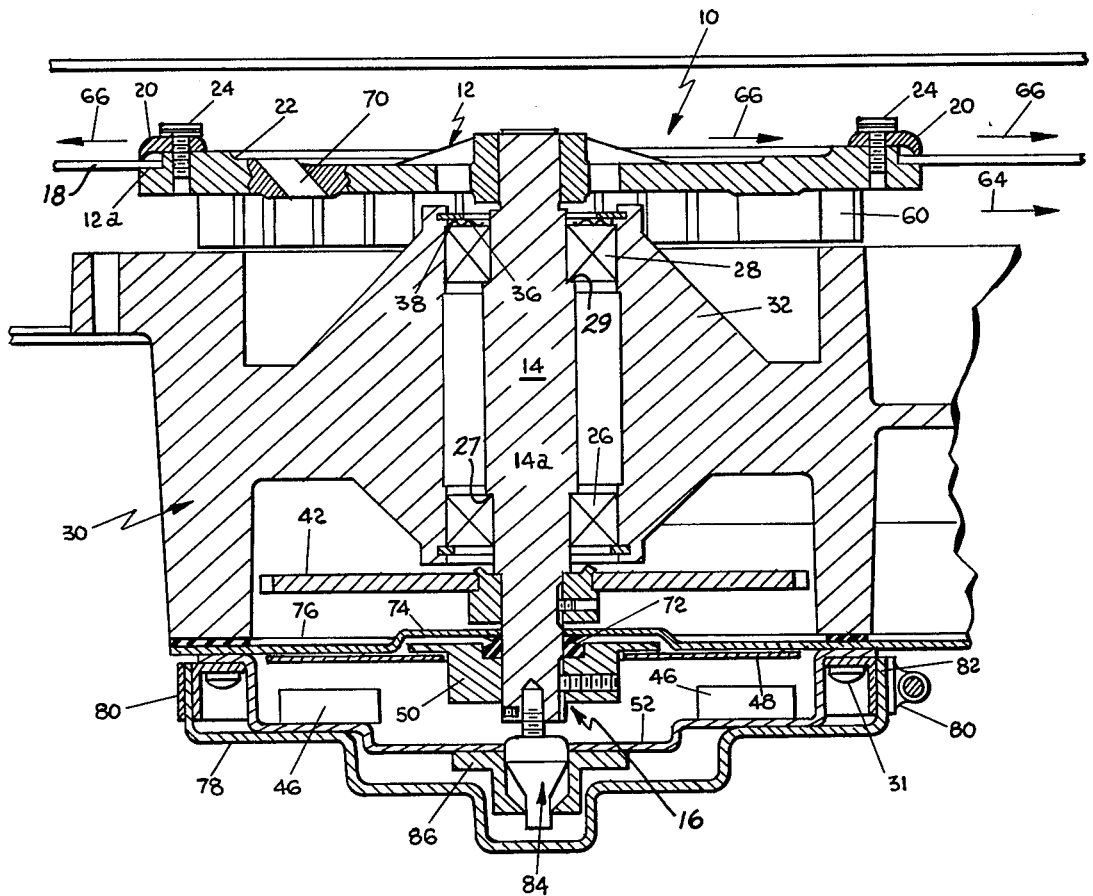
FIG. 1 is a fragmentary cross-sectional side elevational view of a disc recorder having a drive spindle assembly in accordance with an embodiment of this invention.
Figure 2:
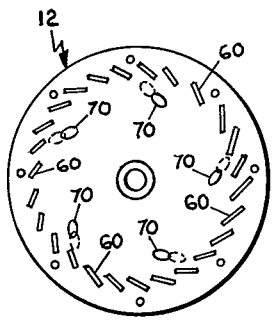
FIG. 2 is a top plan view of an air impeller comprising part of the drive spindle assembly shown in FIG. 1.

Referring to FIG. 1, a drive spindle assembly 10 includes an impeller pump 12, a shaft 14 and DC motor 16. The shaft is an elongated cylindrical member passing through the central axis of the impeller pump and that of the DC motor, and is mechanically coupled to both for drive purposes. poses. An upper surface 12a extending around the parimeter of impeller pump 12 provides a continuous co-planar support surface for the edge of the magnetic recording disc 18, which is secured in place by a plurality of spaced clips 20 attached to a raised annular mounting ridge 22 having tapped mounting holes for attachment screws 24.

The drive spindle assembly 10 is a compact unit which, in accordance with the invention, need not be higher than the height effectively determined by the desired medial length for the shaft between a pair of support bearings 26, 28 which are disposed at a spacing sufficient to preclude cocking or twisting off-center excursions of the shaft within its mounts during any expectable condition of operation. As indicated, the bearings 26, 28 are preferably retained in suitable bosses formed in a support frame 30 having a central hub portion 32. Preferably, the bearings are held in their spaced positions by shoulders 27, 29 on the spindle shaft defined by reduced areas on which the bearings seat. The top bearing 28, and thus the entire spindle assembly is retained in position by a split ring, or snap ring, 38 received within a groove in the top of the hub portion 32 of the support frame with one or more spring washers 36 between the bearing and its snap ring to resiliently bias the spindle against end wise movement. The lower bearing 26 rests atop a split ring, or snap ring 40, also received in a groove in the hub, which prevents downward movement of this bearing and of the spindle assembly. The spindle assembly also preferably includes a segment transducer 42, which may be a disc with a slotted or toothed edge, which may be sensed by an appropriate transducer (magnetic, or optical). The transducer disc 42 is fixed to shaft 14 by a set screw, or in any desired manner. As illustrated, the drive shaft 14 is preferably a continuous member passing through the motor at one end and the impeller at the other end and extending through the parts disposed therebetween, direct-coupled to all.

As stated above, the motor 16 is not only direct-coupled to the drive shaft 14, but is preferably a flat, DC motor of the type typically known as a "pancake" motor, which is generally used for quite different applications including, for example, electric power-driven windows in automobiles. While such a motor is a known commodity in the sense of being commercially available, it may be pointed out that use of such a motor in an application such as the present one is anomalous, even though of particular advantage since, in the first place, the drive torque and speed regulation of such a motor are very favorable, particularly when compared to the customary AC synchrononous motors typically used, and furthermore, the physical configuration of the pancake motor is favorable, providing a very small and flat physical package which helps make a more compact drive unit.

As generally illustrated in FIG. 1, a motor of this type is exceedingly simple from a structural point of view, constituting in its most basic terms only a permanent magnet formation 46 and a flat printed circuit-type rotor 48 fixed to a central hub 50, which is secured directly to the spindle shaft, as by a set screw (as illustrated) or other such means. The magnet structure is held in place by a dished housing 52 which covers the lower portion of the motor and may be secured to the bottom of the support frame 30 by machine screws 31 as illustrated. As stated, pancake motors entirely suitable for this application are commercially available, and for example one suitable such motor is manufactured by P. M. I. (Printed Motor, Inc., a division of Kollnorgen Corporation, Glencoe, N.Y.) and identifed as their Model 12.

Somewhat more particularly relative to the motor 16, it will be noted that the lowermost end of spindle shaft 14, which attaches to the rotor hub 50, is shielded and in fact sealed from the interior of support frame 30. Preferably, this may be accomplished by a chevron-type seal 72 which seats in a recess formed in the top of the rotor hub 50 and which has a snug, press-type fit on the shaft 14. Chevron seal 72 has an upwardly directed top lip portion which wipes against the underside of a lower cover 74 which closes the bottom of the support frame 30, the cover having an opening for shaft 14 which is only slightly larger than the diameter of the shaft itself. Between the cover and the bottom of support frame 30, a yieldable 76 preferably helps seal the interior of the support frame. Chevron seal 72 is preferably a lubricous, resilient member such as a suitable polymeric material, most preferably, a PTFE -filled Neoprene (for example, 10 percent filled). The entire bottom extremity of the motor is preferably sealed from the exterior by a closure boot 78, which may advantageously be a desired semi-rigid plastic, held in place by a peripheral clamp 80 which angularly contracts the boot about an inner collar 82 held in place by the screws 31 mentioned previously. The bottom extremity of spindle shaft 14 preferably is connected to a mercury-filled wiper contact 84, which is seated within a recess fixture 86 mounted to the underside of the motor bottom plate 52. The mercury wiper contact is a known, commercial device for electrically grounding a rotating part, and consists basically of a mercury-filled cup within which rotates a cone member.

Depending upon particular factors involved, the sealing measures just described, and particularly the chevron shaft seal 72, can be very important from the standpoint of long-term operating satisfaction. This is because in a direct-coupled motor and spindle construction on the type described, brushes used in the drive motor will, practically as an inherent part of their nature, produce small dust or dirt particles as the brushes degrade through use. An accumulation of even a small amount of such particles on the recording disc, or present in the air flowing over the surfaces of the disc, may produce a significant adverse effect on the quality of recording achieved, and is therefore to be prevented if at all possible. Due to the action of the impeller vanes 60 carried on the bottom of the impeller unit 12, such particles could, if not otherwise sealed or other measures taken, naturally be drawn upwardly along the spindle and impelled outwardly, directly over the recording disc, particularly since the impeller vanes will produce a low-pressure region at the bottom portion of the spindle shaft, directly above the area of the motor. The sealing measures described have been found to produce a very significant favorable effect toward the elimination or reduction of such dust particles.

The impeller 12 has a series of air-pumping vanes 60 arranged in an annular formation around its underside (see FIG. 1), whose lowermost extremities are closely spaced above an annular shoulder 62 at the top of the support frame 30. The space between these two portions may be varied to suit particular conditions, by providing a desired amount of leakage for air through this point. Mainly, the vanes 60 pump air outwardly radially of the impeller, in the direction of the arrows 64, such air being first drawn upwardly past the hub portion 32 of the frame, by which the same may be cooled. Apart from cooling purposes, the air flow from the impeller 12 is used to provide a moving cushion or film of air along the surface of the recording disc 18, and it will be apparent that air moving along the direction of arrows 64 will readily accomplish this purpose. However, it is also desired to pump a film of air along the top of the disc 18, and this is accomplished by a series of openings 70 in the top of the impeller wheel, which bleed air from the area inside the ring of vanes 60 on the underside of the impeller and direct the same outwardly along the top of the recording disc, in the direction of the arrows 66.

Figure 4:
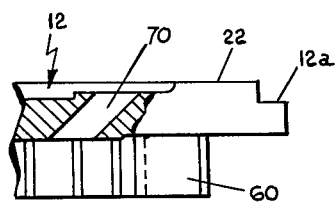
FIG. 4 is a fragmentary cross-sectional elevation taken through the plane IV—IV of FIG. 3.
Figure 3:
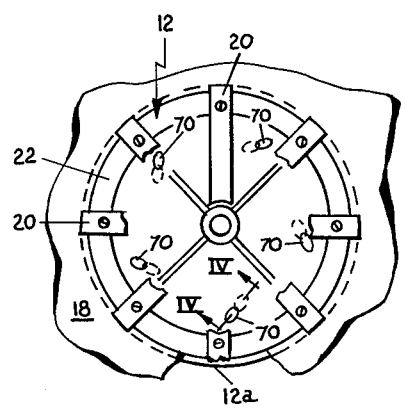
FIG. 3 is a bottom plan view of the impeller shown in FIG. 2.

The positioning and general shape of the bleed air passages 70 is illustrated in FIGS. 3 and 4 (as well as FIG. 1), from which it may be seen that such passages comprise cylindrical bores extending angularly through the web of the impeller, preferably at an acute angle of about 30° relative to the plane of the impeller. As shown, the angular position of these passages causes them to have oval-shaped upper and lower end openings on the top and bottom of the impeller (FIGS. 3 and 4). The shape, size and orientation of the bleed air passages 70 may be varied somewhat to change the particularities of the air current expelled over the top of the disc, as represented by the arrows 66 in FIG. 1; however, in the particular apparatus shown in the drawings, the passages 70 represent a proper geometric configuration for expelling a suitable air film for the purposes stated above, the same comprising on the order of from about 10 to 15 percent of the total volume of air drawn upwardly past the spindle hub 32 by the impeller vanes 60. Of course, it is not only the total amount of air so utilized which is important, but also the orientation of the flow and the passages 70 are designed so that their cumulative effect is to expel a sheet of air directly outward over the top of the recording disc, thereby facilitating good head aerodynamics and enhancing recording performance. The vanes 60 on the underside of the impeller also discharge air over the surface (i.e., the underside) of the disc in a forceful radially directed stream, but with larger volume than is strictly necessary merely to satisfy recording requirements on the underside of the disc, since it is desirable to draw large amounts of air upward over the spindle assembly for cooling purposes, and consequently there may be a need to dissipate excess amounts of air, some of which may merely be allowed to escape through the gap between the bottom of the vanes and the adjacent edge of the housing. Also, some of the excess can be conducted directly through the impeller, as by openings passing orthogonally through the latter, for example near the center therof.

In accordance with the foregoing description of a particular embodiment, it may readily be seen that the present invention provides new and highly useful concepts for a direct-coupled disc recorder, and for a DC-power disc drive, as well as for a disc drive with integral air pump having broad, general aspects as well as more particular aspects such as those described. Both broad and particular aspects are claimed to be within the range of the inventive concepts, and in this connection, it should be appreciated that the particular aspects described are for purposes of illustration, and that numerous particular variations are possible within the broader confines of the invention. For example, and only as a partial example, the impeller may be implemented in many ways, as may the structure for producing a flow of air outward over both sides of the disc. The same is also true of the "platform" shown for mounting the disc, which certainly may be changed structurally while providing the same end, which is not necessarily an integral part of the impeller means. Thus, except as may otherwise appear from the various parts of the description hereinabove, or elsewhere, the particular structures shown and described should be regarded as examples of apparatus useful in the practice of the invention, even though such structures may have particular usefulness or novelty in and of themselves in the overall device disclosed.

The embodiments of the invention in which an exclusive property or privilege is claimed are defined as follows:

1. A disc-drive spindle assembly and means for mounting the same in a disc recorder, comprising in combination: a disc recorder frame, including means defining a pair of spaced bearing supports; a direct-coupled spindle assembly, including a spindle shaft, a motor with its rotor coupled directly to said spindle shaft, a mounting platform means attached to said spindle shaft for mounting a disc and rotating the same with said shaft and air-moving means driven by the spindle for forcing air along at least part of the spindle shaft to help cool the shaft; at least two bearings encircling said shaft at mutually spaced locations, said bearings supported in position by said spaced bearing supports of said recorder frame to thereby rotatably support the spindle assembly on said frame as a direct-coupled unit.

2. The disc-drive assembly as defined in claim 1, including means defining an air flow path along a length of said spindle which includes said motor and said bearings, and wherein said air-moving means forces air along said length of said flow path to cool said motor and bearings.

3. The disc-drive assembly as defined in claim 2, wherein said air-moving means includes portions of said disc-mounting platform.

4. The disc-drive assembly as defined in claim 3, wherein said portions of said disc-mounting platform comprise air impeller vanes.

5. The disc-drive assembly as defined in claim 4, wherein said platform comprises a rotary member carried concentrically on said spindle shaft and having air impeller vanes on at least one side.

6. The disc-drive assembly as defined in claim 5, wherein said rotary member includes means for discharging a flow of air across each side of a disc mounted thereon.

7. The disc-drive assembly as defined in claim 6, wherein said means for discharging air includes air flow orifices on the side of said rotary member opposite that having said impeller vanes.

8. The disc-drive assembly as defined in claim 7, wherein said rotary member has web portions disposed between its center and its outer periphery, with impeller vanes on one side of the member and bleed air passages extending through the plane of the web portions.

9. A disc support platform for a disc recorder of the type utilizing a recording disc having a central opening for receiving a rotary drive means, said support platform comprising: a central axial shaft-carrying portion for rotational drive of the platform; web portions extending outwardly from said central axial portion; a plurality of spaced co-planar disc support portions located on a circular locus and carried near the outer ends of said web portions; and air-impelling means carried on said platform for moving a flow of air generally toward or away from the platform as the same is rotatably driven.

10. The disc support platform as defined in claim 9, wherein said air impelling means moves air generally radially of the platform, and outward over the surface of a disc disposed on said disc support portions.

11. The disc support platform as defined in claim 10, wherein said air impelling means moves air outward over both sides of a disc so disposed.

12. The disc support platform as defined in claim 10, wherein said air-impelling means includes a plurality of impeller vanes carried on at least one side of the platform.

13. The disc support platform as defined in claim 11, wherein said air-impelling means includes a plurality of impeller vanes carried on at least one side of the platform.

14. The disc support platform as defined in claim 13, wherein said air impelling means also includes air discharge openings on a side of said platform opposite a side carrying said impeller vanes.

15. The disc support platform as defined in claim 14, wherein said air discharge openings comprise passages extending through the plane of said web portions.

16. The disc support platform as defined in claim 15, wherein the longitudinal axes of said passages extend at an acute angle relative to said web portion plane.

17. The disc support platform as defined in claim 16, wherein said passages comprise longitudinally tapered apertures extending through said web portions.

18. A direct-coupled disc drive assembly for disc recorders, comprising: a drive spindle comprising a rotary shaft; bearing means for rotatably supporting said shaft; means mounted on said shaft for rotatably carrying a recording disc; a rotor element for an electric motor, said rotor coupled concentrically to said spindle shaft to rotate in unison therewith; a motor stator disposed concentrically with said rotor and in close proximity thereto, and means for holding said stator mounted in such position; said rotor and stator comprising component parts of a direct-coupled DC motor which rotates said recording disc through said spindle shaft and said disc-carrying means, and said rotor being a thin, flat member and comprising with said stator a generally flat, compact motor of the type known as a "pancake" motor.

19. The disc-drive assembly of claim 18, wherein said drive spindle shaft has an end portion located near said motor stator, and including a wiper contact means in electrical contact with said shaft near its said end portion for electrically grounding the shaft.

20. The disc-drive assembly of claim 18, including means for sealing said motor from said means for carrying a recording disc.

21. The disc-drive assembly of claim 20, wherein said means for sealing is positioned to seal said bearing means from said motor.

22. The disc-drive assembly of claim 20, wherein said means for sealing comprises an annular member encircling said shaft.

23. The disc-drive assembly of claim 22, including a closure panel having an aperture, said spindle shaft passing through said aperture, and said annular sealing member co-acting with said shaft and said closure panel about said aperture to effect a seal at the aperture.

24. The disc-drive assembly of claim 23, wherein said seal is mounted to rotate with said shaft.

* * * * *